No. 12,269. REISSUED SEPT. 20, 1904.

J. HUNTER.

TOOL HOLDER.

APPLICATION FILED MAY 12, 1903.

Witnesses

Mollie L. Burke

D. Kreimendahl

Inventor

James Hunter by H. T. Hart

Attorney

No. 12,269. Reissued September 20, 1904.

UNITED STATES PATENT OFFICE.

JAMES HUNTER, OF HARTFORD, CONNECTICUT, ASSIGNOR OF ONE-HALF TO CHARLES GLOVER, OF NEW BRITAIN, CONNECTICUT.

TOOL-HOLDER.

SPECIFICATION forming part of Reissued Letters Patent No. 12,269, dated September 20, 1904.

Original application filed October 29, 1901, Serial No. 80,419. Divided and application filed January 14, 1902, Serial No. 89,749. Patented November 4, 1902, No. 713,004. Application for reissue filed May 12, 1903. Serial No. 156,848.

*To all whom it may concern:*

Be it known that I, JAMES HUNTER, a citizen of the United States, and a resident of Hartford, county of Hartford, State of Connecticut, have invented certain new and useful Improvements in Tool-Holders, of which the following is a full, clear, and exact description whereby any one skilled in the art may make and use the same.

The invention relates particularly to an apparatus of the kind specified having features of novelty and advantage.

Figure 1:
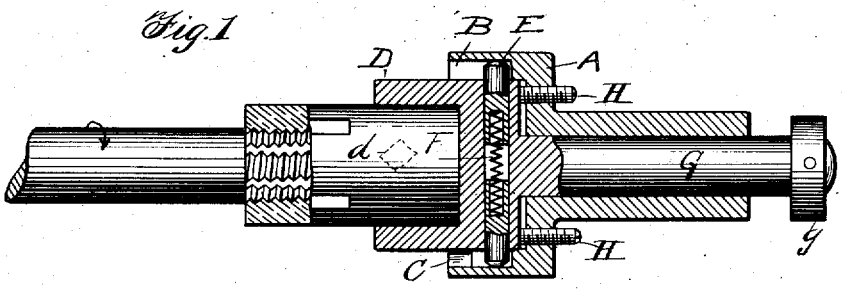
Figure 2:
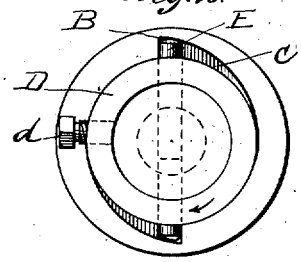
Figure 3:
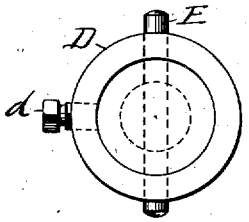
Figure 4:
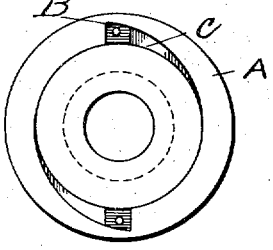
Figure 5:
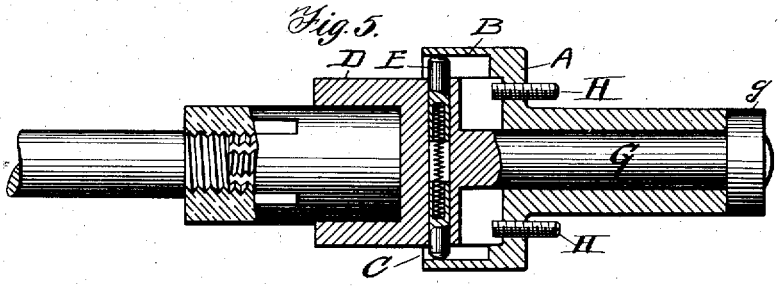
Figure 6:
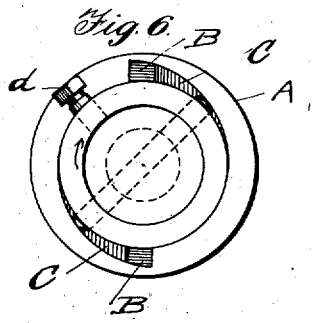

In the drawings, Figure 1 is a side view, partly in section, of a tool-holder embodying my invention, showing the parts in their original position before beginning to cut the thread. Fig. 2 is an end view of the holder with the die removed. Fig. 3 is an end view of the die-holder. Fig. 4 is an end view of the body portion. Fig. 5 is a side view, partly in section, similar to Fig. 1, but with the parts in their position after the thread has been cut. Fig. 6 is an end view showing the operation of the cam-slots and the pins.

Referring to the drawings, A denotes the body part having a reduced shank by which it is supported in the turret of the machine. The body part A has two grooves B formed lengthwise along its interior face, these grooves at their outer ends opening into cam-shaped circumferential slots C C. The die-holder D is of ordinary construction, having a recess for the die and means, such as the screw *d*, for holding the die in place. In this die-holder are located two pins E E, movable radially and continually pressed outward by a spring F. At the rear of the die-holder is a reduced shank G, which passes through the shank on the body part and projects beyond it. At the end of the shank of the die-holder is secured a collar *g*, which limits the movement of the forward travel of the die-holder through the body.

The operation of the device is as follows: The die in the die-holder is presented to the blank which is to be operated upon and which rotates as shown in Fig. 1 of the drawings. The pins E E on the die-holder are located in the lengthwise grooves of the body. When the die is brought into contact with the blank, it of course begins to cut a thread, the die-holder being held against rotary movement by the pins E in the grooves B. The die-holder is, however, free to move lengthwise of the body part, and this it will do under the influence of the thread which is being cut on the blank, and it will continue to move forward until such time as the pins come into the path of the cam-shaped slots C C. The die-holder is then free to revolve with the blank, the pins being formed to travel by the high points of the cam-slots by compressing the spring F. When the machine reverses, the die-holder reverses its direction of rotation until the pins come in contact with the sides of the lengthwise grooves formed by the high points of the cam-slots. The further rotation of the die-holder is thus prevented, and under the influence of the thread which has been cut the die-holder is driven backward to its original position, the pins traveling in the lengthwise grooves in the body. The forward movement of the die-holder is limited by the collar *g*, secured to the end of its shank. The inward movement of the die-holder is limited by the stop-screws H H, which project through the rear wall of the body. By means of these screw-stops the length of the thread to be cut can be adjusted to any desired degree, and the tool may be made to cut a single thread or a dozen or more by simply changing the adjustment of these screws.

This application is a division of my original application serially numbered 80,419 and filed October 29, 1901.

I claim as my invention—

1. In a device of the class specified the body portion, grooves arranged lengthwise thereof, said grooves opening at their outer ends into cam-shaped slots, the die-holder capable of lengthwise movement with respect to the body, and radially-movable pins adapted to move in the lengthwise grooves and in the cam-slots in said body, substantially as described and for the purposes set forth.

2. In a device of the class specified the body portion, grooves arranged lengthwise thereof, cam-shaped slots formed near one end of said body portion and arranged in communication with said lengthwise slots, the die-holder capable of movement lengthwise within the body, pins carried by the die-holder and movable radially with respect thereto, said pins engaging said grooves, and springs pressing the pins into said grooves, all substantially as described and for the purposes set forth.

3. In a device of the class specified the body, the die-holder movable lengthwise thereof and non-rotatable except at the outer limit of its lengthwise travel, and a stop adjustably mounted in the body and adapted to engage the die-holder on its inward movement and thus determine the amount of lengthwise travel of said die-holder with respect to said body, substantially as described.

4. In a device of the class specified the recessed body, the die-holder located therein and adapted to movement lengthwise thereof, means for preventing rotation of the die-holder relative to the body except at the outer limit of its lengthwise travel, and a stop adjustably mounted in the body and engaging said holder on its inward movement into the body and thus determining the amount of the lengthwise travel of said die-holder with respect to said body.

JAMES HUNTER.

Witnesses:
JOHN J. LAING,
JOHN LAING, Jr.